(No Model.) 2 Sheets—Sheet 1.
R. G. EUNSON.
RETURN BEND.
No. 378,878. Patented Mar. 6, 1888.
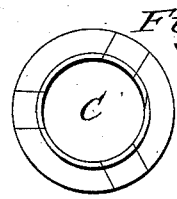
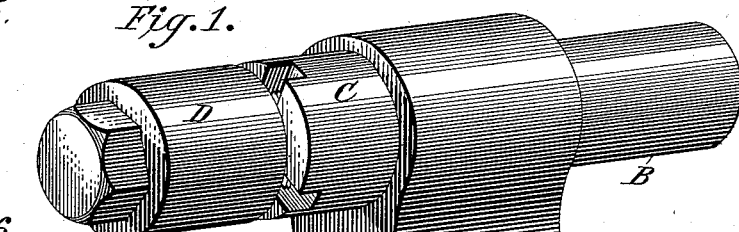
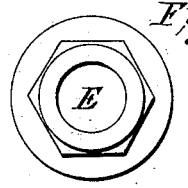
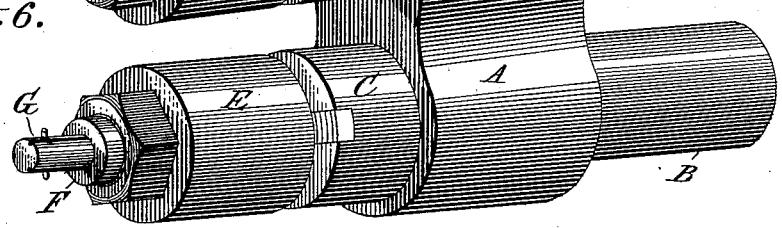
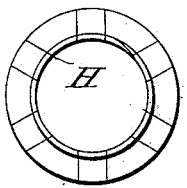
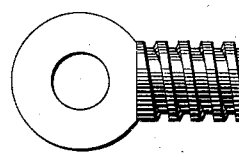
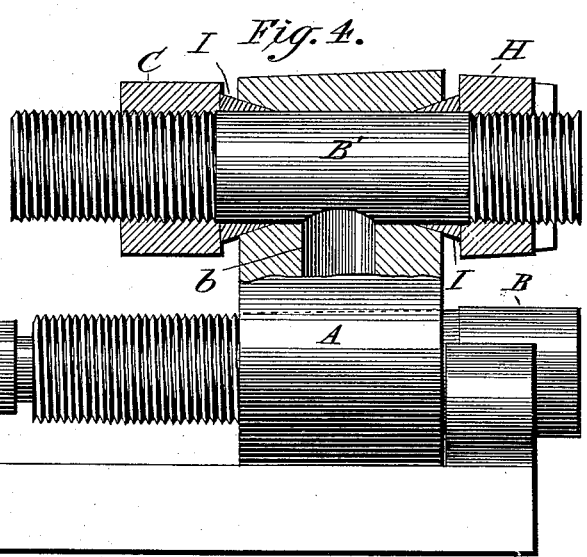
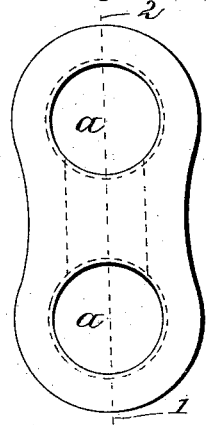
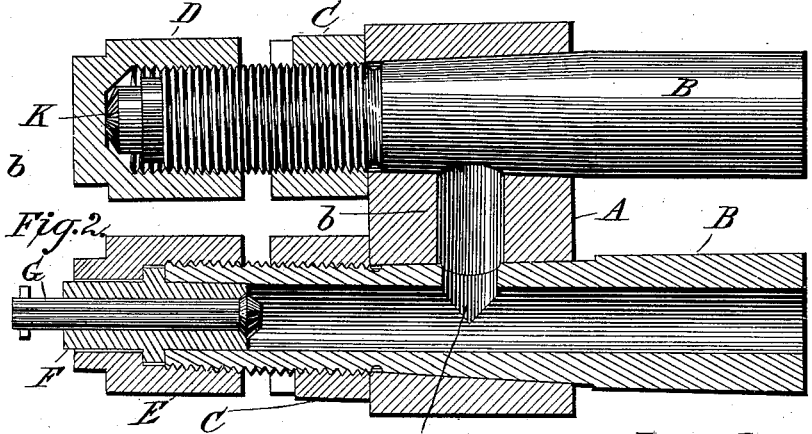
Witnesses:
Chas. W. Smith
John B. Elliott
Inventor:
Robert G. Eunson (No Model.) 2 Sheets—Sheet 2.

R. G. EUNSON.
RETURN BEND.

No. 378,878. Patented Mar. 6, 1888.

Witnesses:
Chas. H. Smith
John B. Elliott

Inventor:
Robert G. Eunson.

UNITED STATES PATENT OFFICE.

ROBERT G. EUNSON, OF NEW YORK, N. Y.

RETURN-BEND.

SPECIFICATION forming part of Letters Patent No. 378,878, dated March 6, 1888.

Application filed July 7, 1887. Serial No. 243,805. (No model.)

*To all whom it may concern:*

Be it known that I, ROBERT G. EUNSON, a citizen of the United States, residing at New York, in the county and State of New York, have invented a new and useful Return-Bend, of which the following is a specification.

My invention relates to improvements in return-bends for uniting the ends of return-tubes of water-tube steam-generators in such a manner as to secure absolutely-tight joints, having great strength, easy to put together, affording easy access to the interior of the tubes for the purpose of cleaning without breaking any joint. I attain these objects by the devices illustrated in the accompanying drawings, in which—

Figure 9:
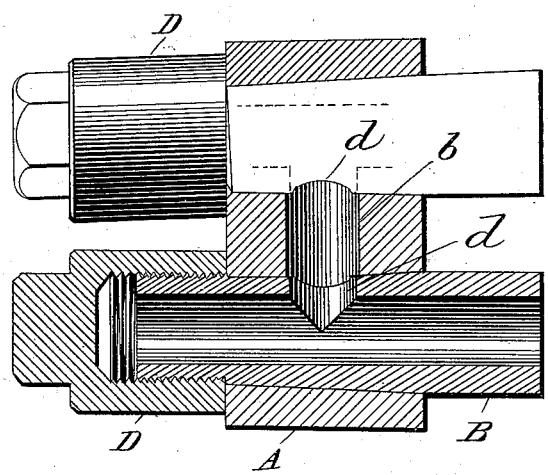
Figure 8:
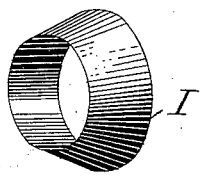

Figure 1 is a perspective view of my return-bend as seen in use, and a portion of the tubes connected thereby. Fig. 2 is a vertical longitudinal section of my return-bend in the line 1 2, Fig. 3, and of one tube and the nuts connected with both. Fig. 3 is a front view of the return-bend itself. Fig. 4 is a return-bend, partly in section, showing one adjustable joint and parts connected therewith; also showing the arrangement for removing a defective tube. Fig. 5 is an end view of the nut C. Fig. 6 is an end view of the nut E. Fig. 7 is an end view of the nut H. Fig. 8 is a perspective view of the conical packing-ring I. Fig. 9 is a vertical section of my return-bend and one tube and nut, the other tube and nut not sected.

Similar letters refer to similar parts throughout the several views.

A is the return-bend, which I preferably make of steel casting. The chambers $a\ a$, which are conical, and the connecting-channel $b$, I form by coring. The chambers I true out by a fluted rimmer of the required taper. The face of each I chafe down to right angles with its axis. This done, the chambers are ready to be ground or otherwise adjusted to a steam-tight fit with the conical parts of the tubes B. In the return-bends that are to have one adjustable joint that chamber I bore out with a rose-head rimmer and countersink for the packing-rings I I, as shown in Fig. 4. The other chamber, being conical, I finish as described.

B B are the tubes, which I make of wrought-iron, lap-welded. The ends of the tubes project through the chambers of A sufficiently far to receive the nuts C, D, and E, which ends I thread. The parts to fill the chambers $a\ a$ in A, I make conical, the exact counterparts of the chambers themselves. In each tube I make the side opening, $d$, equal in area to the bore of the tube, by which communication is established between the tubes through the channel $b$ in A, leaving the tube ends to be closed, as hereinafter described. The thread may be cut and the conical part turned in the usual way, care being taken to make all alike, so that any tube may fit any chamber which is conical in any of the return-bends.

In a structure consisting of several series of returns it is desirable, if not absolutely necessary, to have some tubes adjustable as to length. Therefore I make the tube B' cylindrical, to fit the chamber in A, hereinbefore described. (See Fig. 4.) The front end I thread to fit the nut C. The part beyond A, I thread to fit the nut H, which is so much larger as to pass over the cylindrical joint of B'. It not being practicable to make the joint of B' in A to fit steam-tight, I use the conical packing-rings I I for that purpose, in connection with the nuts C and H, by which the thin edges of the rings are forced into the countersinks in A and pressed close around J, making the joint tight at each end of the chamber. The adjustment is made forward by retracting H and advancing C, and backward by the reverse.

The nuts C, D, E, and H, I make of steel casting. C, Fig. 5, I make with three notches to receive the corresponding prongs of a hollow key, by which it is operated, its function being to hold the tube firmly in its seat in A.

The nut D, Figs. 1, 2, and 9, is a bottomed nut threaded to fit the outer ends of the tubes, which it is used to close, in Fig. 2, in connection with the plug K, hereinafter to be described, and in Fig. 9 without any plug, the lower end of the nut making a steam-tight joint with the face of A.

The nut E, Figs. 2 and 6, I use for closing the ends of tubes requiring gage cocks or valves. It is threaded to fit the ends of the tubes, is bored to allow the end of the plug F to come through, and has a square bearing to confine the plug F on its seat by its flange.

The nut H, Figs. 4 and 7, hereinbefore partially described, I make with six notches to fit a wrench, by which the same is operated from the front.

The plugs F and K, I make of cast-iron, having stems to fit the bore of the tubes and a flange or collar that fits the ends of the same, with which it makes a ground steam-tight joint. The bottom of the nut D, pressing upon the head of K, effectually closes the end of the tube. F, on the contrary, is made the seat of a gage cock or valve, is bored to receive its stem, and is countersunk on the inner end to form its seat, the outer end coming through E.

The valve G, I make of gun-metal. The stem is turned to fit the bore in F. In the stem I cut three or four channels reaching to the base of the conical head, which is to be ground to a steam-tight fit with its seat. The stem of G, I make long enough to receive a spiral spring to keep the valve on its seat. I also put a stop-pin near the point of the stem for the spring to act against.

The mechanism for removing a defective tube is shown in Fig. 4, and need not be further described.

The construction of my return-bend, having only one nut to keep the tube in place and close its end, is shown in Fig. 9.

In use it may be found desirable to furnish certain tubes with gage cocks or valves which have closed ends. As the plugs F and K are made to fit every tube end in the structure, and as the nuts D and E also fit the end of every tube, all that is necessary is to substitute E and F for D and K.

What I claim as my invention, and desire to secure by Letters Patent, is—

1. A return-bend in which the tube ends pass entirely through the same, the tubes communicating with each other by a side opening in each through a channel in the return-bend, the tube ends being threaded, and the tubes held in the return-bend by nuts on the threaded parts thereof bearing against the same, the tube ends being closed by nuts on the extreme threaded ends thereof.

2. A return-bend in which the tube ends pass through the same, the joints therewith being conical, the tubes communicating with each other by a side opening in each through a channel in the return-bend.

3. A return-bend in which the tube ends pass through the same, the tubes being held therein by nuts on the threaded parts thereof and communicating by side openings in each through a channel in the return-bend, the tube ends being closed as follows: one by a plug having a ground joint with the tube end, being held therein by a bottomed nut on the threaded end thereof, and the other by a plug fitted with a gage cock or valve projecting through the nut by which it is held on the end of the tube, all constructed and arranged as shown.

ROBERT G. EUNSON.

Witnesses:
NATHANIEL BUTLER,
CHAS. W. SMITH.